(12) United States Patent
Wells

(10) Patent No.: US 7,176,412 B2
(45) Date of Patent: Feb. 13, 2007

(54) TAPER LOCKING FEATURES BETWEEN COMPONENTS OF A WELDING DEVICE

(75) Inventor: Jeff G. Wells, Old Castle (CA)

(73) Assignee: Tregaskiss Ltd, Ontario (CA)

( * ) Notice: Subject to any disclaimer, the term of this patent is extended or adjusted under 35 U.S.C. 154(b) by 144 days.

(21) Appl. No.: 10/916,031

(22) Filed: Aug. 11, 2004

(65) Prior Publication Data

US 2005/0218131 A1 Oct. 6, 2005

Related U.S. Application Data

(60) Provisional application No. 60/558,236, filed on Mar. 31, 2004.

(51) Int. Cl.
*B23K 9/28* (2006.01)

(52) U.S. Cl. .................................. 219/137.61

(58) Field of Classification Search ........... 219/137.31, 219/137.42, 137.61
See application file for complete search history.

(56) References Cited

U.S. PATENT DOCUMENTS

| | | | |
|---|---|---|---|
| 2,761,049 A | 8/1956 | McElrath et al. ...... | 219/137.52 |
| 3,007,033 A | 10/1961 | Newman et al. ........ | 219/137 R |
| 3,469,070 A | 9/1969 | Bernard et al. ........ | 219/137.31 |
| 3,783,233 A * | 1/1974 | dal Molin ............... | 219/137.61 |
| 4,282,419 A | 8/1981 | Auer ...................... | 219/137.44 |
| 4,675,493 A * | 6/1987 | Gartland et al. .............. | 219/74 |
| 5,338,917 A | 8/1994 | Stuart et al. ........... | 219/137.63 |
| 5,726,420 A * | 3/1998 | Lajoie ................... | 219/137.61 |
| 5,911,894 A | 6/1999 | Colling ................. | 219/137.61 |
| 6,075,227 A * | 6/2000 | Lajoie ................... | 219/137.61 |
| 6,307,179 B1 | 10/2001 | Walters, III ............ | 219/137.42 |
| 6,689,987 B2 | 2/2004 | Altekruse et al. ...... | 219/137.61 |
| 6,720,528 B1* | 4/2004 | Matiash et al. ........ | 219/137.31 |
| 6,888,092 B2 | 5/2005 | Walters | |
| 6,987,237 B2 | 1/2006 | Walters | |
| 6,995,331 B2 | 2/2006 | Samler | |
| 2004/0074887 A1 | 4/2004 | Matlash et al. | |
| 2005/0218132 A1* | 10/2005 | Wells ..................... | 219/137.61 |

FOREIGN PATENT DOCUMENTS

CA 2344142 3/2000

OTHER PUBLICATIONS

International Search Report for PCT Application No. PCT/IB2005/000836 mailed on Aug. 2, 2005.

* cited by examiner

*Primary Examiner*—Kevin P. Kerns
(74) *Attorney, Agent, or Firm*—Proskauer Rose LLP

(57) ABSTRACT

Locking engagement connections between various components of a welding device can include tapered features having varied thread patterns and/or varied angles to ensure that the components remain tight during service. For example, locking engagement connections can be incorporated between a nozzle and a retaining head, a retaining head and a gooseneck, and/or a contact tip and a retaining head.

30 Claims, 5 Drawing Sheets

TAPER LOCKING FEATURES BETWEEN COMPONENTS OF A WELDING DEVICE

CROSS-REFERENCE TO RELATED APPLICATION

This application claims the benefits of and priority to U.S. Provisional Patent Application Ser. No. 60/558,236 filed on Mar. 31, 2004, which is owned by the assignee of the instant application and the disclosure of which is incorporated herein by reference in its entirety.

FIELD OF THE INVENTION

The invention relates generally to welding devices, and more particularly to locking engagement connections between components of a welding gun.

BACKGROUND OF THE INVENTION

Welding equipment, e.g., metal inert gas (MIG) welding equipment, can be used for welding one metal workpiece to another metal workpiece. A welding gun can be designed to allow a user or robot to direct a metal welding wire toward a specific location on a target metal workpiece. The components of a typical welding gun include a handle, a gooseneck, a retaining head, a contact tip, and a nozzle. The welding wire is fed through the welding gun, and ultimately through a passageway in the contact tip, which is disposed at an end of the welding gun. The welding wire, when energized for welding, carries a high electrical potential. When the welding wire makes contact with the target metal workpiece an electrical circuit is completed and current flows through the welding wire, across the metal workpiece and to ground. The current causes the welding wire and the metal of the workpieces in contact with the welding wire to melt, thereby allowing workpieces to be joined. Extreme heat is caused by the resulting current flow. Since the contact tip usually includes copper or a copper alloy, the extreme heat tends to cause it to wear out relatively quickly.

Changing the contact tip usually involves removing and/or replacing other welding gun components as well, such as the nozzle or retaining head. The components of a welding gun typically have screw threads for attachment to the welding gun. Unfortunately, these threaded connections tend to loosen as the welding gun is used, requiring users to stop welding in order to re-tighten these connections, resulting in down time and losses in efficiency and productivity. In addition, loose connections can be a source of electrical resistance and in turn generate excessive heat within a welding gun. Heat in welding guns translates into shorter consumable life, tip burn back, and even melting of components.

Therefore, a need exists in the art for means of attachment of components that result in an improved and extended useful life of the components and a more secure method of attachment of the components to a welding gun.

SUMMARY OF THE INVENTION

The invention, in various embodiments, incorporates locking engagement connections (also referred to as "taper locking features" and "tapers") between the various components of a welding device to ensure that the components remain engaged during service. For example, a locking engagement connection can be incorporated between a nozzle and a retaining head, a retaining head and a gooseneck, and/or a contact tip and a retaining head. The connections can improve and extend the useful life of the components by providing a more secure method of attachment of the components to each other or to the welding device, which reduces the chance of overheating and improves heat transfer and electrical conductivity between components. A welding device employing the invention can utilize a single taper between two components, or a combination of tapers can be used.

In some embodiments of the invention, a welding device utilizes two locking engagement connections, each with a different angle between its respective components. Thus, one locking engagement connection may engage with a different amount of clamping or retention force than the other locking engagement connection. As a result, one of the connections may have a tendency to come apart before the other when a force (e.g., a loosening force or a loosening torque) is provided. In some applications, this can be advantageous because a more accessible connection can be configured to come apart before a less accessible connection.

In one aspect, the invention features a welding device including a first locking engagement connection disposed between a first component and a second component with the first locking engagement connection including a first tapered portion defining a first included angle. The welding device also includes a second locking engagement connection disposed between the second component and a third component with the second locking engagement connection including a second tapered portion defining a second included angle. The second included angle can be smaller than the first included angle. Upon application of a force (e.g., a torquing force) between the first component and the third component, the first locking engagement connection adjusts before adjustment of the second locking engagement connection.

In one embodiment, the first component includes a contact tip and the second component includes a retaining head. The third component can include a gooseneck. In one embodiment, the welding device also includes a third locking engagement connection between a nozzle and the retaining head.

In various embodiments, the first locking engagement connection can engage with a clamping force different than (e.g., greater than) a clamping force of the second locking engagement connection. In some embodiments, the first locking engagement connection disengages before the second locking engagement connection upon application of a loosening force. In one detailed embodiment, the first included angle is about 20° and the second included angle is about 12°. In various embodiments, either the first locking engagement connection or the second locking engagement connection can include a threaded portion.

In another aspect, the invention provides a welding device including a first locking engagement connection disposed between a first component and a second component with the first locking engagement connection defining a first tapered portion with a first included angle. The welding device also includes a second locking engagement connection disposed between a third component and a fourth component. The second locking engagement connection includes a second tapered portion defining a second included angle smaller than the first included angle. Upon application of a force between the first component and the fourth component, the first locking engagement connection adjusts before adjustment of the second locking engagement connection. In some embodiments, the second component and the third component include portions of the same component.

In yet another aspect, the invention provides a retaining head including a first tapered surface adapted for locking engagement with a tapered surface of a first member and a second tapered surface adapted for locking engagement with a tapered surface of a second member. Upon application of a force (e.g., a torquing force) between the first member and the second member, the locking engagement between the tapered surfaces of the retaining head and the first member adjusts before adjustment of the locking engagement between the tapered surfaces of the retaining head and the second member. In some embodiments, the retaining head also includes a third tapered surface adapted for locking engagement with a tapered surface of a third member.

In still another aspect, the invention features a method of engaging components of a welding device. The method includes providing a first locking engagement connection disposed between a first component and a second component, and including a first tapered portion defining a first included angle. The method also includes providing a second locking engagement connection disposed between the second component and a third component, and including a second tapered portion defining a second included angle smaller than the first included angle. Applying a force between the first component and the third component adjusts the first locking engagement connection before adjustment of the second locking engagement connection. In various embodiments, either the first locking engagement connection or the second locking engagement connection can improve either electrical conductivity or heat transfer between adjacent components of the welding device.

In another aspect, the invention provides a method of engaging components of a welding device. The method includes providing a retaining head including a first tapered surface adapted for locking engagement with a tapered surface of a first member and a second tapered surface adapted for locking engagement with a tapered surface of a second member. Applying a force between the first member and the second member adjusts the locking engagement between the tapered surfaces of the retaining head and the first member before adjustment of the locking engagement between the tapered surfaces of the retaining head and the second member.

In yet another aspect, the invention features an apparatus for engaging components of a welding device. The apparatus includes a retaining head itself including a first tapered surface adapted for locking engagement with a tapered surface of a first member and a second tapered surface adapted for locking engagement with a tapered surface of a second member. The apparatus also includes a means for applying a force between the first member and the second member so that the locking engagement between the tapered surfaces of the retaining head and the first member adjusts before the locking engagement between the tapered surfaces of the retaining head and the second member.

Other aspects and advantages of the invention will become apparent from the following drawings, detailed description, and claims, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1:
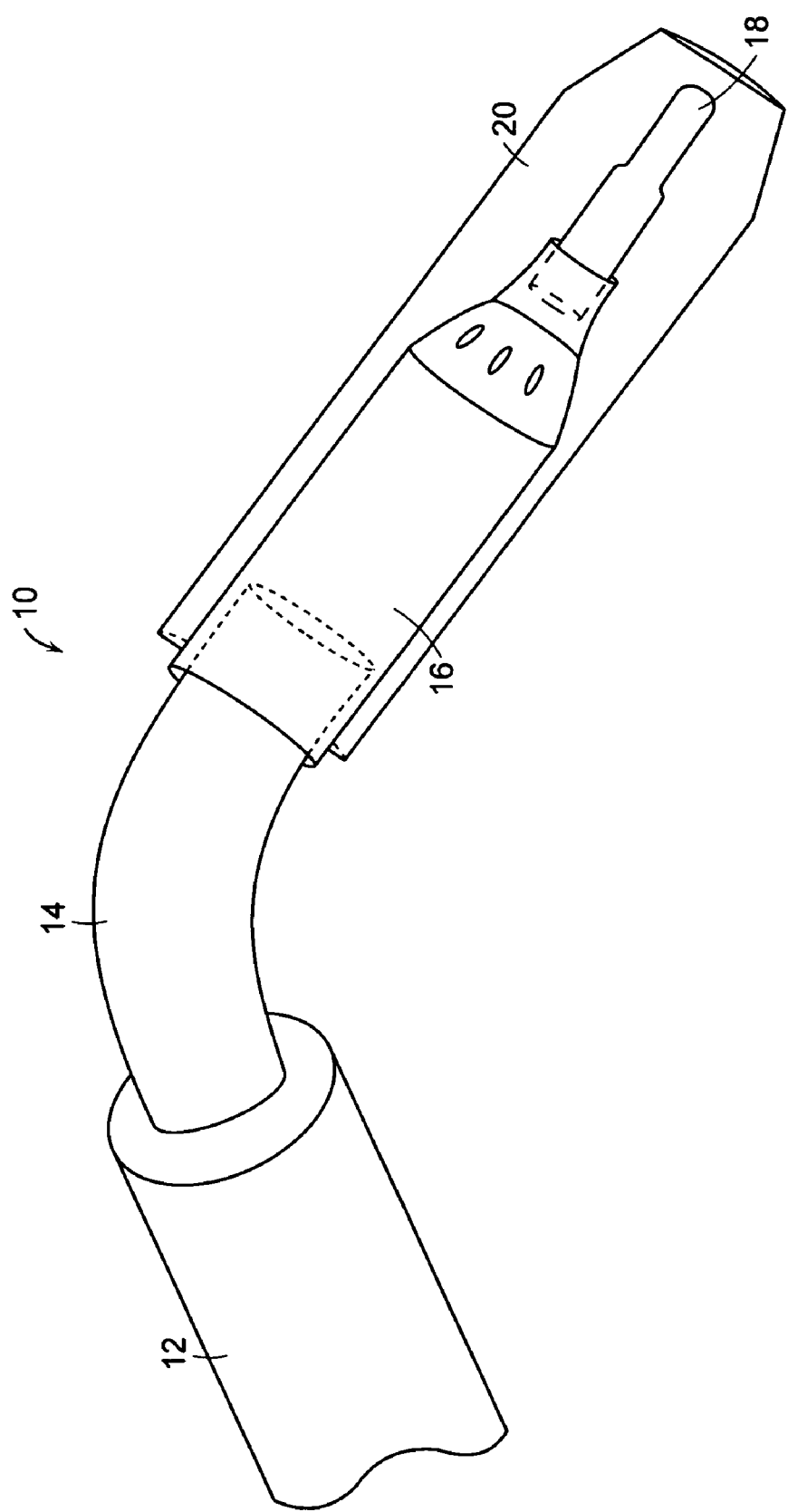
FIG. 1 illustrates a perspective view of an exemplary welding device.

A welding device, in various embodiments of the invention, can include a plurality of components. For example, a welding gun 10, e.g., as illustrated in FIG. 1, can include a handle 12, a goose neck 14, a retaining head 16, and a contact tip 18. The welding gun 10 can also include a nozzle 20, which is shown in FIG. 1 in cross-section for clarity. The welding gun 10 can be hand-held or suitable for use by a robotic system.

In various embodiments, components of the welding device incorporate one or more locking engagement connections to ensure that the components remain engaged during service. The connections can improve and extend the useful life of the components by providing a more secure method of attachment of the components to each other or to the welding device, which reduces the chance of overheating and improves heat transfer and electrical conductivity between components.

In an embodiment using two or more locking engagement connections, one may engage with a different amount of force (e.g., a clamping force or a retention force) than a second locking engagement connection. As a result, one of the connections may have a tendency to disengage prior to the other when a force (e.g., a loosening force or a loosening torque) is provided. In some applications, this can be advantageous because a more accessible connection can be configured to come apart before a less accessible connection.

Figure 2:
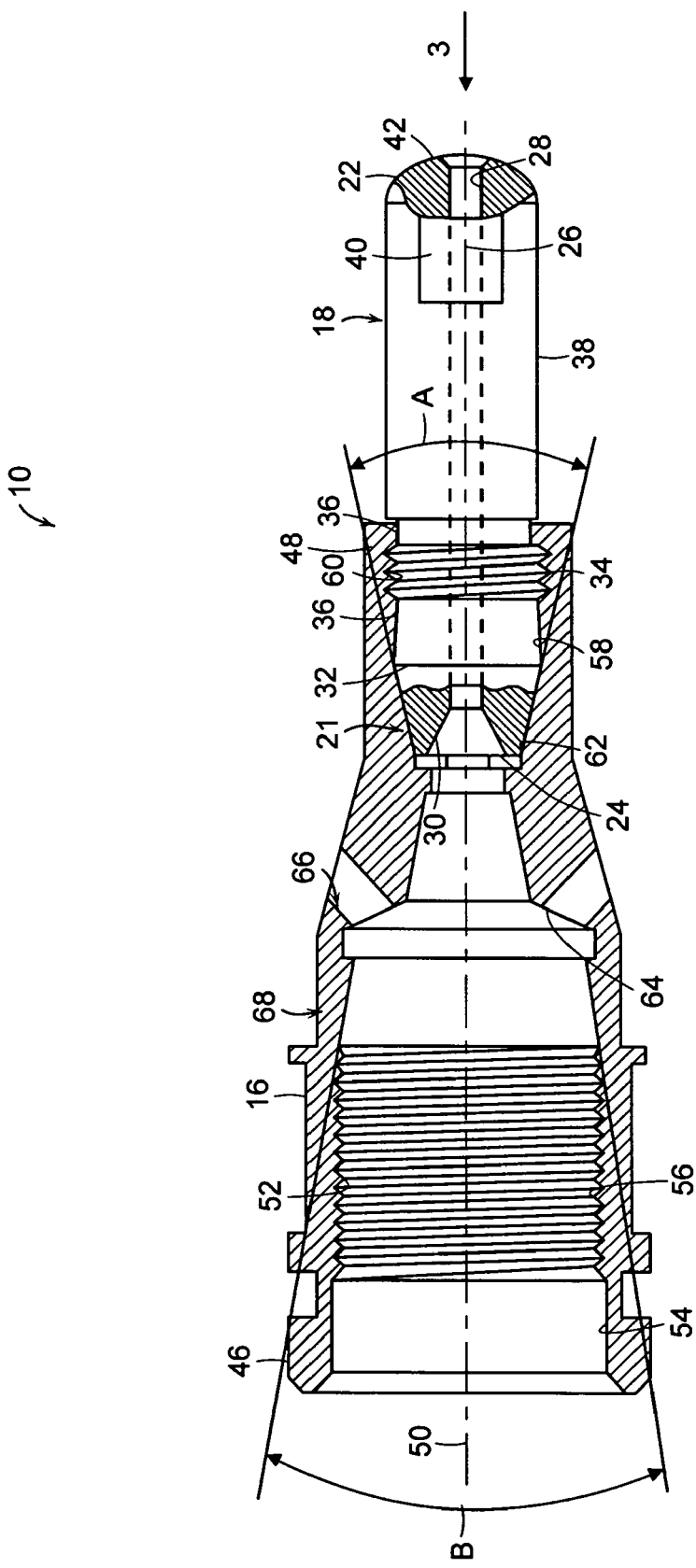
FIG. 2 depicts a cross-sectional view of an exemplary embodiment of a portion of a welding device including locking engagement connections according to the invention.

FIG. 2 depicts an exemplary embodiment of an end portion of the welding gun 10 including a locking engagement connection 21 between the contact tip 18 and the retaining head 16, where the locking engagement connection 21 has been configured to improve the retention of the contact tip 18 by the retaining head 16 and to facilitate quick removal of the contact tip 18 from the retaining head 16. The nozzle 20 is not shown in FIG. 2, although one can be attached to the welding gun 10 or the retaining head 16.

The contact tip 18 as shown in FIG. 2 can be elongated in shape and has a first end 22 and an oppositely disposed second end 24. A tip axis 26 passes through the first end 22 and the second end 24 of the contact tip 18. The contact tip 18 defines a wire feed aperture 28 about the tip axis 26 that passes through the contact tip 18. The aperture 28 has a tapered receiving end 30 at the second end 24 of the contact tip 18, which can facilitate receiving welding wire (not shown) that can pass through the aperture 28 of contact tip 18.

Referring to FIG. 2, the contact tip 18 is shown with a tapered portion 32 disposed at the second end 24. An included angle "A" of the tapered portion 32 can be about 20°, although the included angle "A" can be larger or smaller depending on the application, e.g., between about 5° and about 45°. Other angles, larger or smaller, may be used without departing from the scope of Applicants' invention.

A threaded portion 34 can be disposed on the contact tip 18 adjacent the tapered portion 32. In various embodiments, a clearance diameter portion 36 is provided on one or both sides of the threaded portion 34.

In some embodiments, the threaded portion 34 can include double threads having an axial length greater than a pitch of the double threads (e.g., having an axial length greater than 3 times a pitch of the double threads). A fine thread can facilitate retention of the tip, while a double-threaded portion can facilitate quick removal of the contact tip 18 from the retaining head 16. In an embodiment having double threads, the double threads of the threaded portion 34 require half the number of turns to remove the contact tip 18 as compared to conventional tips using single threads, a feature that is desirable for robotic welding applications.

According to the embodiment illustrated in FIG. 2, an extension portion 38, larger in diameter than the clearance portion 36, extends from the first end 22 to the clearance portion 36, or to the threaded portion 34 if a clearance portion is not used. The extension portion 38 can assume any of several shapes, including a cylindrical form or a hexagonally cross-sectioned form. Other forms and cross-sectional shapes can also be used. The extension portion 38 can also include a gripping feature 40. The gripping feature 40, as shown in FIG. 2, includes a pair of parallel flats at the first end 22 of the contact tip 18. Alternatively, the gripping feature 40 can use a hexagonally shaped extension portion with three pairs of opposed flats. Other shapes requiring tools other than an open end wrench can be employed as the gripping feature 40. In one embodiment, the contact tip 18 can include a chamfer 42 on the first end 22.

In the illustrated embodiment, the retaining head 16 includes a first end 46 and a second end 48. A longitudinal axis 50 passes through the first end 46 and the second end 48 of the retaining head 16. The longitudinal axis 50 can be substantially coincident with tip axis 26. An axial aperture 52 can extend along longitudinal axis 50, generally aligned with the wire feed aperture 28. In one embodiment, a first diameter portion 54 of the axial aperture 52 can be disposed at the first end 46, and can include internal threads 56 disposed therein. A second diameter portion 58 of the aperture 52 can be disposed at the second end 48 and can be smaller in diameter than the first diameter portion 54. The second diameter portion 58 can include internal threads 60.

A tapered seat 62 in the second diameter portion 58 can be complementary in shape to the tapered portion 32 of the contact tip 18, such that surfaces of the seat and the tapered portion can engage each other and mate together. These surfaces when seated or mated themselves can form a tapered portion of the welding device. This tapered portion can be used as a locking engagement connection, which can include a threaded portion adjacent the tapered portion. The included angle "A" can be selected to provide a locking engagement effect between the retaining head 16 and the contact tip 18 when the contact tip 18 is subjected to a force, e.g., a torquing force in a tightening direction.

In some embodiments, the included angle "A" is smaller than that illustrated in FIG. 2, and a greater number of threads are engaged between the retaining head 16 and the contact tip 18, thereby providing a more secure connection that has a greater resistance to loosening of the connection. Double threading the contact tip 18 can also facilitate removal and replacement of the contact tip 18, as described in more detail above. Use of the tapered engagement between the contact tip 18 and the retaining head 16 enables the use of fewer engagement threads on the contact tip 18, while still developing a sufficient amount of retention force between the parts to maintain proper engagement. This tapered locking engagement of the invention also provides a contact area between the contact tip 18 and the retaining head 16 that facilitates the rapid conduction of heat away from the contact tip 18.

In some embodiments, the retaining head 16 includes a transition region 64 in the axial aperture 52, disposed between the first diameter portion 54 and the second diameter portion 58. Gas ports 66 can extend from the transition region 64 to the outside of the retaining head 16, and can be oriented so that inert gas passing from inside the retaining head 16 through the gas ports 66 displaces air around the first end 22 of the contact tip 18.

As shown in FIG. 2, the retaining head 16 includes a tapered region 68, which can be used as a connection for locking engagement between a tapered region of the gooseneck 14 (not shown) and the retaining head 16. Although not shown, the tapered region of the gooseneck 14 can be threaded and engage the tapered region 68 of the retaining head 16. These tapered regions when seated or mated together can form a tapered portion of the welding device, which can be used as a locking engagement connection that can include a threaded portion adjacent the tapered portion. Included angle "B" of the tapered region 68 of the retaining head 16 can be larger, smaller, or substantially the same as the included angle "A" of the tapered portion 32 of the contact tip 18. In some embodiment, the included angle "B" can be between about 5° and about 45°. Other angles, larger or smaller, may be used without departing from the scope of Applicants' invention. In one detailed embodiment, included angle "B" can be about 12°.

According to another aspect of the invention, the internal threads 56 in the first diameter portion 54 of the retaining head nozzle 16 can engage a threaded sleeve (not shown) at an end of the goose neck 14. Upon tightening, the threaded portion 34 of the contact tip 18 engages the internal threads 60 of the retaining head 16 until the tapered portion 32 engages the seat 62. The clearance portions 36 disposed between the threaded portion 34 and the extension portion 38 facilitate a clamping engagement between the tapered portion 32 and the retaining head 16 by preventing engagement of the extension portion 38 against the retaining head 16. The axial force induced by the threaded portion 34 and the internal threads 60 in response to application of a force (e.g., a torque or torquing force) between the contact tip 18 and the retaining head 16 causes the tapered portion 32 to wedge into seat 62, thereby developing a frictional load between the contact tip 18 and the nozzle 16, which resists relative movement between the two parts. Locking engagement between the components is thereby effectively achieved.

Figure 3:
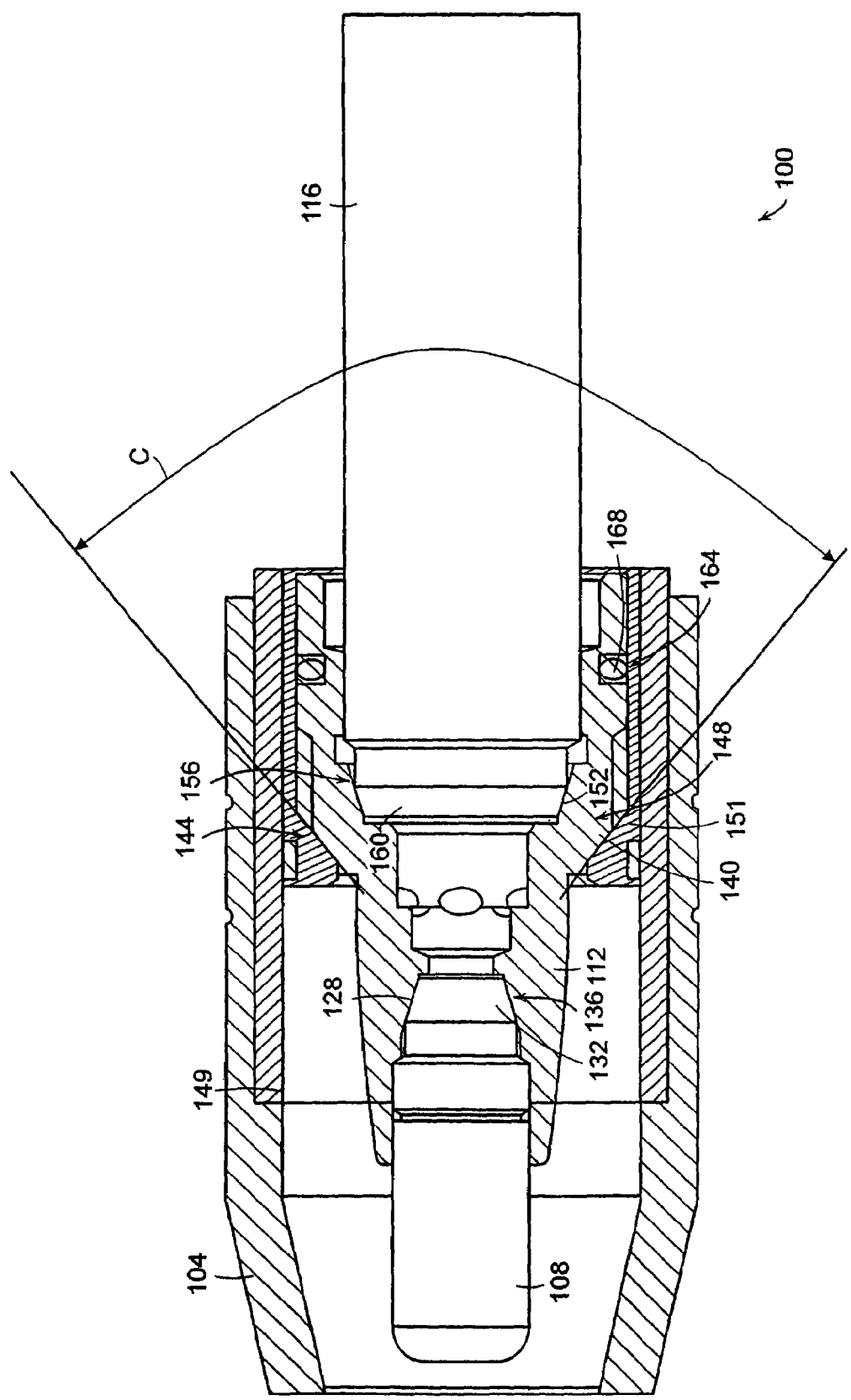
FIG. 3 shows a cross-sectional view of an exemplary end portion of a welding device including locking engagement connections according to the invention.
Figure 4:
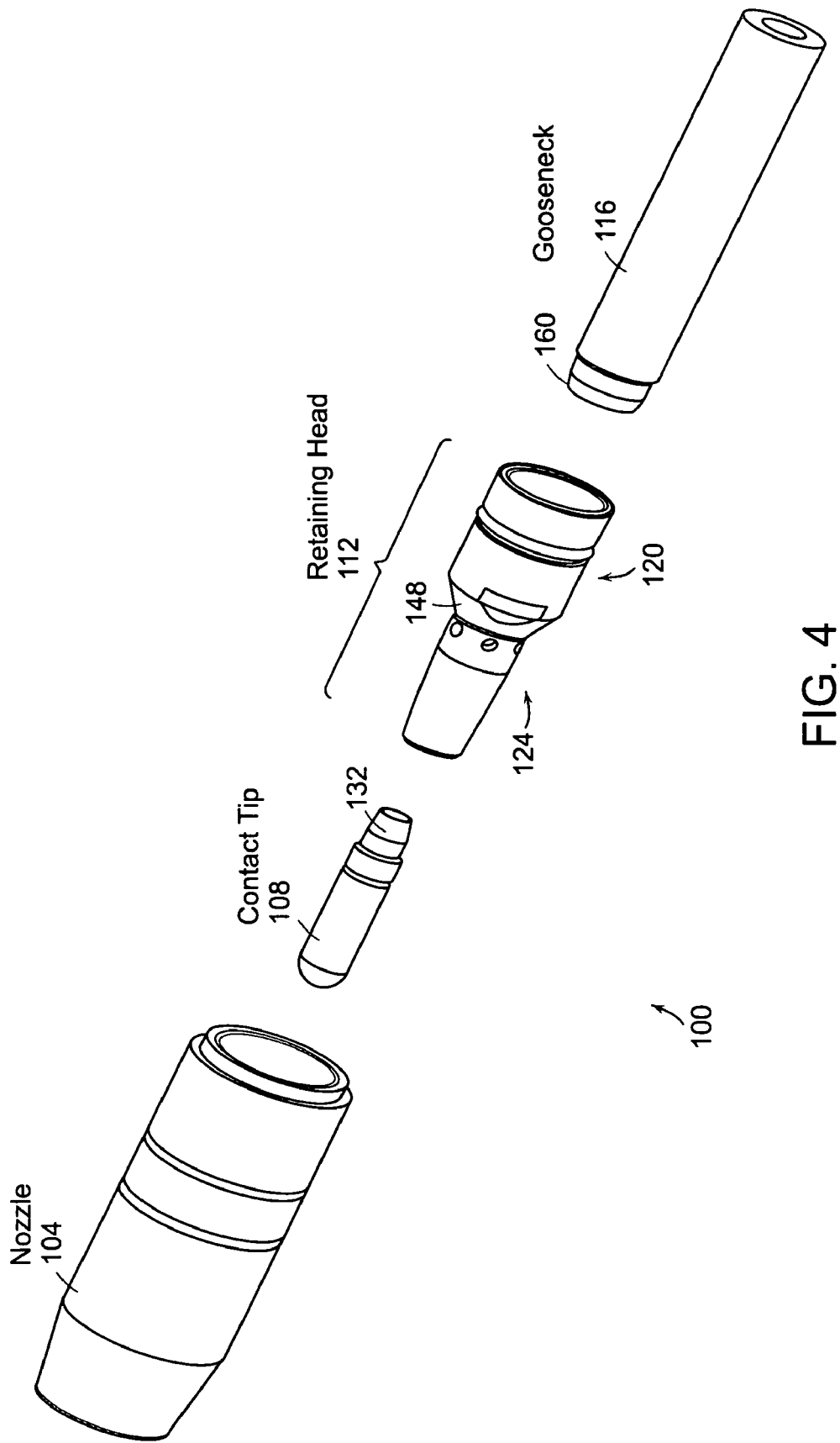
FIG. 4 depicts an exploded view of an exemplary welding device including locking engagement connections according to the invention.

FIG. 3 shows a cross-section of and FIG. 4 shows an exploded view of another illustrative embodiment of an end portion of a welding gun 100 that utilizes features of the invention described above. As illustrated, the welding gun 100 includes a nozzle 104, a contact tip 108, a retaining head 112, and a gooseneck 116. The nozzle 104 directs a gas for cooling a weld. The contact tip 108 can possess features as described above with respect to the contact tip 18. In various embodiments, the retaining head 112 includes a nozzle retaining portion 120 for stabilizing the nozzle 104, and a gas diffuser portion 124 for directing the cooling gas from inside the gooseneck 116 into the nozzle 104. In some embodiments, the retaining head 112 can be formed from two separate components, e.g., a nozzle retainer and a gas diffuser. The gooseneck 116, which can have a bent configuration, provides the connection to the handle, to a power supply, and optionally to a robotic welding system. The welding gun 100 can include a conduit liner (not shown) to improve the feed of a welding wire through the central bore of the welding gun.

FIGS. 3 and 4 show an additional illustrative embodiment of a locking engagement connection 128 between the contact tip 108 and the retaining head 112. According to these embodiments, the contact tip 108 includes a tapered portion 132 and the retaining head 112 includes a first tapered portion 136. The contact tip 108 and the retaining head 112 can be threaded together, as described above. During the threading process, the tapered portion 132 of the contact tip 108 seats into the first tapered portion 136 of the retaining head 112, at the locking engagement connection 128. These tapered portions when seated or mated themselves can form a tapered portion of the welding device. In various embodiments, the threads can include a single thread pattern or include a plurality of thread patterns.

As shown in FIGS. 3 and 4, a locking engagement connection 140 can be used to mate the nozzle 104 and the retaining head 112. The nozzle 104 can include a tapered portion 144, and the retaining head 112 can include a second tapered portion 148. The nozzle 104 and the retaining head 112 can be threaded together, thereby causing the second tapered portion 148 of the retaining head 112 to be seated into the tapered portion 144 of the nozzle 104 at the locking engagement connection 140. These tapered portions when seated or mated themselves can form a tapered portion of the welding device. The thread can be a single thread or multi-thread pattern.

An inside surface of the nozzle 104 can include an insulating material 149, e.g., a machineable porcelain material. The insulating material 149 can be fixedly or removably attached to the inside surface of the nozzle 104. The insulating material 149 can shield the nozzle 104 from electrical potential from the retaining head 112 or gooseneck 116. In some embodiments, a surface of this insulating material 149 can include a tapered portion and threads for engagement with the retaining head 112.

In various embodiments, the nozzle 104 includes a nozzle insert 151 (described in more detail below with reference to FIG. 5), which can be mated with the retaining head 112 using the tapered locking engagement surfaces of the invention. The nozzle insert 151 can be fixedly or removably attached either to the inside surface of the nozzle 104 or to a surface of the insulating material 149.

In various embodiments, the respective tapered portion of the nozzle 104, the insulating material 149, or the nozzle insert 151 can include an included angle "C", which can be larger, smaller, or substantially the same as either included angle "A" or "B". In some embodiments, included angle "C" is between about 5° and about 75°, although the angle can be larger or smaller depending on the application. In one detailed embodiment, included angle "C" can be about 60°.

FIGS. 3 and 4 also show another exemplary embodiment of a locking engagement connection 152, disposed between the retaining head 112 and the gooseneck 116. The retaining head 112 can include a third tapered portion 156, and the gooseneck 116 can include a tapered portion 160. The retaining head 112 and the gooseneck 116 can be threaded together, thereby seating the tapered portion 160 of the gooseneck 116 into the third tapered portion 156 of the retaining head 112 at the locking engagement connection 152. These tapered portions when seated or mated together can form a tapered portion of the welding device. The thread can be a single thread or multi-thread pattern.

In some embodiments, the retaining head 112 can include a groove 164, e.g., for an o-ring. FIG. 3 illustrates an o-ring 168 seated in the groove. The o-ring 168 can provide a fluid seal (e.g., for a cooling gas) between the retaining head 112 and the nozzle insert 151 of the nozzle 104, although, in various embodiments, the o-ring 168 can seat against the nozzle 104 or the insulating material 149 of the nozzle 104.

In accordance with the invention, certain components of a welding device (e.g., the welding gun 10 or 100) can use more than one taper of the invention. For convenience, FIGS. 3 and 4 show a single welding gun 100 with three embodiments of locking engagement connections 128, 140, and 152. This need not be the case. A welding device of the invention may utilize only a single locking engagement connection, or two or more locking engagement connections.

For example, the locking engagement connection 140 can be used to engage the nozzle 104 and the retaining head 112, while the locking engagement connection 152 can be used to engage the same retaining head 112 with the gooseneck 116. In another exemplary embodiment, the locking engagement connection 128 can mate the contact tip 108 and the retaining head 112, and the locking engagement connection 152 can be used to engage the retaining head 112 and the gooseneck 116. Other combinations are also possible, and as described above, more than two tapers can be used.

Further, two or more different locking engagement connections can be used to provide the locking engagement of the invention, and each locking engagement connection can use a different included angle (e.g., angles "A" and "B" of FIG. 2 and angle "C" of FIG. 3). Use of two different angles within, e.g., a welding gun, causes the two different connections to engage with different amounts of force, e.g., clamping or retention force. Thus, one of the connections can have a tendency to come apart before the other when a force, e.g., a loosening force or a loosening torque, is provided. More specifically, the connection utilizing a larger included angle "A" can loosen first upon application of a force (e.g., a loosening force or a loosening torque), for example, as compared with a connection using a smaller included angle such as included angle "B". Of course, such a force can be directly applied, or it can result from other forces such as vibration, temperature, and the like.

Embodiments of the invention include, but are not limited to, the locking engagement connection 128 defining an included angle (e.g., of about 20°) between the contact tip 108 and the retaining head 112, and the locking engagement connection 152 defining a smaller included angle (e.g., of about 12°) between the retaining head 112 and the gooseneck 116. Of course, other angles may be used without departing from the scope of Applicants' invention.

A force (e.g., a loosening force or a loosening torque) between the gooseneck 116 and the contact tip 108 preferentially results in the contact tip 108 loosening from the retaining head 112 before the retaining head 112 loosens from the gooseneck 116. In some applications this is advantageous, e.g., because the first connection (i.e., between the contact tip and the retaining head) is more accessible, or because a user may wish to change a contact tip without removing the retaining head. The invention can also be applied to applications with more than two connections, and in some applications, it may be desirable for different connections to become preferentially loosened. Of course, the invention can also be applied in connection with tightening forces or tightening torques.

Figure 5:
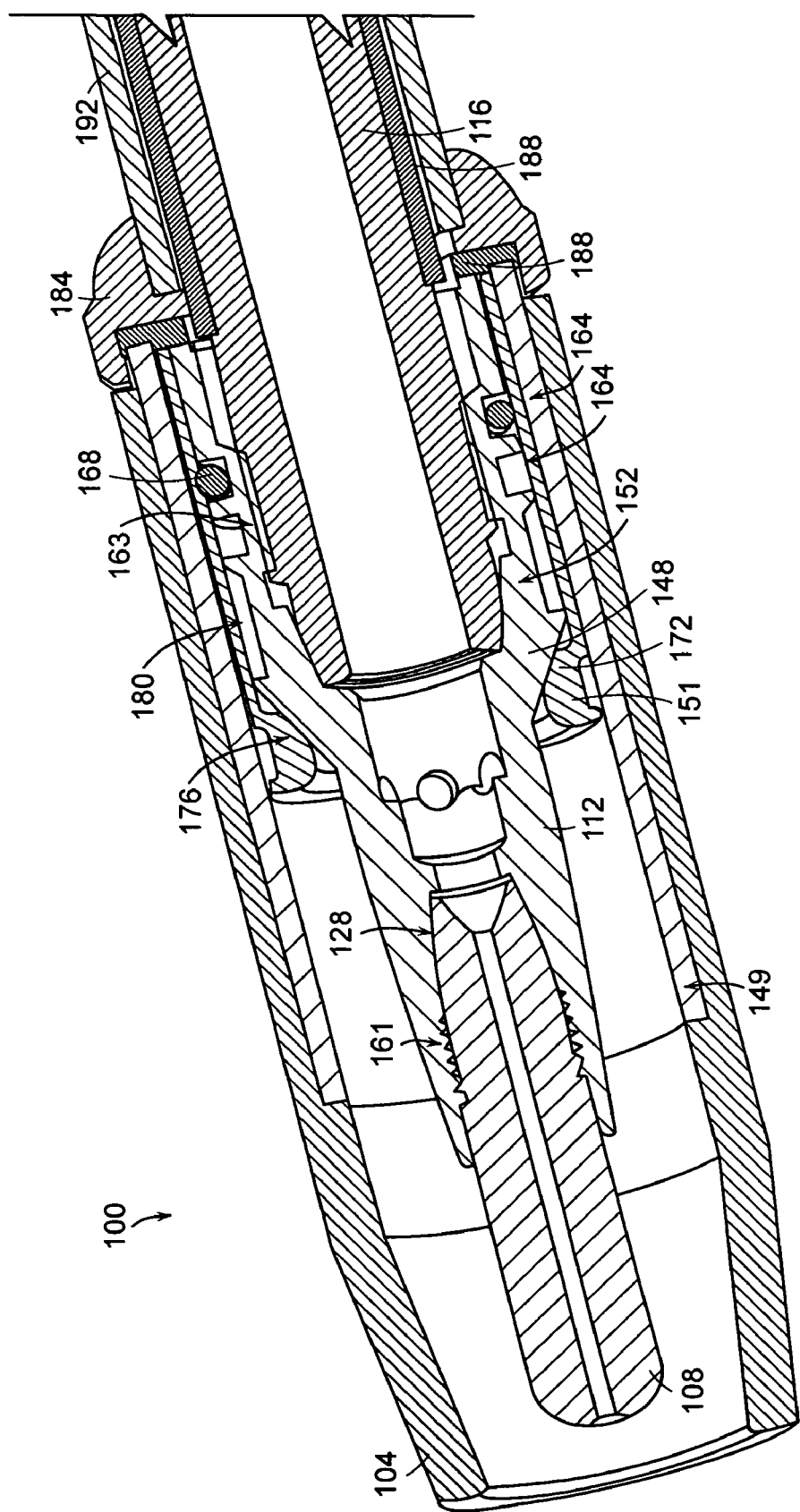
FIG. 5 illustrates a cross-sectional view of an exemplary embodiment of a portion of a welding device including locking engagement connections according to the invention.

FIG. 5 depicts another embodiment of a welding device. The welding gun 100 can include the locking engagement connections 128 and 152, as illustrated in FIGS. 3 and 4. FIG. 5 also depicts the intersection 161 of the threads of the contact tip 108 and the retaining head 112, as well as the intersection 163 of the threads of the retaining head 112 and the gooseneck 116. The retaining head 112 can also include a plurality of thread patterns, e.g., machined into a plurality of surfaces of the retention head 112. In addition, the threads can be single threaded or multi-threaded.

As shown in FIG. 5, the nozzle 104 of the welding gun 100 can include a nozzle insert 151. The nozzle insert 151 can be seated over the retaining head 112, thereby preventing the nozzle 104 from rocking, and ensuring that the contact tip 108 remains centered in the nozzle 104. The nozzle insert 151 of the nozzle 104 can include a tapered portion 172 that mates with the second tapered portion 148 of the retaining head 112 at connection 176. The nozzle insert 151 can engage the threads of the retaining head 112 at thread intersection 180. The nozzle insert 151 can also slide onto the retaining head 112 like a sleeve (e.g., without using a threaded connection). In such embodiments, the tapered connection 176 need not be used. The threads can include a single thread pattern or a multi-thread pattern.

The welding gun 100 illustrated in FIG. 5 also includes a ring 184 including additional insulating material 188. The ring 184, e.g., a shock ring, can provide electrical insulation. The gooseneck 116 of the welding gun 100 can include a housing 192, which can also include insulating material 188. According to the embodiment illustrated in FIG. 5, the retaining head 112 includes a plurality of grooves 164, e.g., for seating an o-ring 168 for sealing components of the welding gun 100.

While the invention has been particularly shown and described with reference to specific illustrative embodiments, it should be understood that various changes in form and detail may be made without departing from the spirit and scope of the invention as defined by the appended claims. By way of example, any of the disclosed features may be combined with any of the other disclosed features to form a welding device utilizing the tapered locking features or locking engagement connections described herein.

What is claimed is:

1. A welding device comprising:
a first locking engagement connection disposed between a first component and a second component, and including a first tapered portion defining a first included angle and a first threaded portion disposed relative to the first tapered portion; and
a second locking engagement connection disposed between the second component and a third component, and including a second tapered portion defining a second included angle and a second threaded portion disposed relative to the second tapered portion, wherein the second included angle is smaller than the first included angle,
wherein upon application of a force to the first component, the first locking engagement connection adjusts before adjustment of the second locking engagement connection.

2. The welding device of claim 1 wherein the first component comprises a contact tip and the second component comprises a retaining head.

3. The welding device of claim 2 wherein the third component comprises a gooseneck.

4. The welding device of claim 3 further comprising a third locking engagement connection between a nozzle and the retaining head.

5. The welding device of claim 1 wherein the first locking engagement connection engages with a clamping force different than a clamping force of the second locking engagement connection.

6. The welding device of claim 5 wherein the clamping force of the second locking engagement connection is greater than the clamping force of the first locking engagement connection.

7. The welding device of claim 1 wherein the first locking engagement connection disengages before the second locking engagement connection upon application of a loosening force.

8. The welding device of claim 1 wherein the force comprises a torquing force.

9. The welding device of claim 1, wherein a first diameter of the first locking engagement connection is smaller than a second diameter of the second locking engagement connection.

10. A welding device comprising:
a first locking engagement connection disposed between a first component and a second component, and including a first tapered portion defining a first included angle and a first threaded portion disposed relative to the first tapered portion; and
a second locking engagement connection disposed between a third component and a fourth component, and including a second tapered portion defining a second included angle and a second threaded portion disposed relative to the second tapered portion, wherein the second included angle is smaller than the first included angle,
wherein upon application of a force to the first component, the first locking engagement connection adjusts before adjustment of the second locking engagement connection.

11. The welding device of claim 10 wherein the second component and the third component comprise portions of the same component.

12. The welding device of claim 11 further comprising a third locking engagement connection disposed between the third component and a fifth component.

13. The welding device of claim 10 wherein the first locking engagement connection engages with a clamping force different than a clamping force of the second locking engagement connection.

14. The welding device of claim 13 wherein the clamping force of the second locking engagement connection is greater than the clamping force of the first locking engagement connection.

15. The welding device of claim 10 wherein the first locking engagement connection disengages before the second locking engagement connection upon application of a loosening force.

16. The welding device of claim 10 wherein the force comprises a torquing force.

17. The welding device of claim 10, wherein a first diameter of the first locking engagement connection is smaller than a second diameter of the second locking engagement connection.

18. A retaining head comprising:
a first tapered surface disposed relative to a first threaded portion and adapted for locking engagement with a tapered surface of a first member; and a second tapered surface disposed relative to a second threaded portion and adapted for locking engagement with a tapered surface of a second member;

wherein upon application of a force to the first member, the locking engagement between the tapered surfaces of the retaining head and the first member adjusts before adjustment of the locking engagement between the tapered surfaces of the retaining head and the second member.

19. The retaining head of claim 18 further comprising a third tapered surface adapted for locking engagement with a tapered surface of a third member.

20. The retaining head of claim 18 wherein the force comprises a torquing force.

21. The retaining head of claim 18 wherein at least one of the first threaded portion is disposed substantially adjacent the first tapered surface or the second threaded portion is disposed substantially adjacent the second tapered surface.

22. The retaining head of claim 18, wherein a first diameter of the first threaded portion is smaller than a second diameter of the second threaded portion.

23. A method of engaging components of a welding device, comprising:

providing a first locking engagement connection disposed between a first component and a second component, and including a first tapered portion defining a first included angle and a first threaded portion disposed relative to the first tapered portion;

providing a second locking engagement connection disposed between the second component and a third component, and including a second tapered portion defining a second included angle and a second threaded portion disposed relative to the second tapered portion, the second included angle being smaller than the first included angle, and applying a force to the first component so that the first locking engagement connection adjusts before adjustment of the second locking engagement connection.

24. The method of claim 23 further comprising engaging the first locking engagement connection with a clamping force greater than a clamping force of the second locking engagement connection.

25. The method of claim 23 wherein, upon application of a loosening force, the first locking engagement connection disengages before the second locking engagement connection.

26. The method of claim 23 wherein at least one of the first locking engagement connection and the second locking engagement connection improves electrical conductivity between adjacent components of the welding device.

27. The method of claim 23 wherein at least one of the first locking engagement connection and the second locking engagement connection improves heat transfer between adjacent components of the welding device.

28. The method of claim 23 wherein applying a force between the first component and the third component comprises applying a torquing force between the first component and the third component.

29. A method of engaging components of a welding device, comprising:

providing a retaining head comprising a first threaded portion disposed relative to a first tapered surface adapted for locking engagement with a tapered surface of a first member and a second threaded portion disposed relative to a second tapered surface adapted for locking engagement with a tapered surface of a second member; and applying a force to the first member so that the locking engagement between the tapered surfaces of the retaining head and the first member adjusts before adjustment of the locking engagement between the tapered surfaces of the retaining head and the second member.

30. An apparatus for engaging components of a welding device, comprising:

a retaining head comprising:

a first threaded portion disposed relative to a first tapered surface adapted for locking engagement with a tapered surface of a first member; and a second threaded portion disposed relative to a second tapered surface adapted for locking engagement with a tapered surface of a second member; and a means for applying a force to the first member so that the locking engagement between the tapered surfaces of the retaining head and the first member adjusts before adjustment of the locking engagement between the tapered surfaces of the retaining head and the second member.

* * * * *